United States Patent [19]

Crepeau et al.

[11] Patent Number: 5,594,073
[45] Date of Patent: Jan. 14, 1997

[54] DIALKYLTHIOUREA CURED ELASTOMERIC ROOFING COMPOSITION

[75] Inventors: Allen E. Crepeau, Southbury; Thomas L. Jablonowski, Naugatuck, both of Conn.

[73] Assignee: Uniroyal Chemical Company, Inc., Middlebury, Conn.

[21] Appl. No.: 443,841

[22] Filed: May 18, 1995

Related U.S. Application Data

[63] Continuation-in-part of Ser. No. 825,747, filed as PCT/US90/04473, Aug. 9, 1990, published as WO91/05012, Apr. 18, 1991, abandoned, which is a continuation of Ser. No. 415,002, Sep. 29, 1989, abandoned.

[51] Int. Cl.$^6$ ........................................... C08C 19/20
[52] U.S. Cl. ........................ 525/331.8; 525/332.7; 525/352
[58] Field of Search ................ 525/331.8, 332.7, 525/332.8

[56] References Cited

U.S. PATENT DOCUMENTS 3,531,444  9/1970  Behrens.
3,644,304  2/1972  Behrens.
3,897,405  7/1975  Sou et al..
4,012,332  3/1977  Behrens ............................. 252/182
4,461,875  4/1985  Crepeau ............................. 427/140
4,514,442  5/1987  Crepeau ............................. 428/521
4,666,785  7/1984  Crepeau ............................. 525/348

FOREIGN PATENT DOCUMENTS 1298267  6/1969  Germany.
9004473  4/1991  WIPO.

*Primary Examiner*—Christopher Henderson
*Attorney, Agent, or Firm*—Raymond D. Thompson

[57] ABSTRACT

Disclosed are ambient temperature-curable roofing compositions and ambient temperature-curable sheeting compositions, both of which include an elastomer or elastomer mixture such as ethylene-propylene non-conjugated diene terpolymer, butyl rubber, and mixtures thereof. Such elastomers are cured with conventional dialkylthiourea and sulfur type curatives. Also used are conventional thiuram and dithiocarbamate type accelerators. The compositions thus produced are essentially free of hexasulfide compounds which are known to have the structural formula $[(CH_2)_nNCS]_2S_6$, wherein "n" is 4 or 5.

13 Claims, No Drawings

DIALKYLTHIOUREA CURED ELASTOMERIC ROOFING COMPOSITION

REFERENCE TO RELATED APPLICATIONS

This application is a continuation-in-part ("C-I-P") of U.S. patent application Ser. No. 07/825,747 filed as PCT/US90/04473 Aug. 9, 1990 and published as WO91/05012 Apr. 18, 1991, (abandoned), which is a continuation of U.S. Patent Application Ser. No. 07/415,002 filed Sep. 29, 1989 (now abandoned), the benefit of which is now claimed for purposes of priority pursuant to 35 USC §120.

TECHNICAL FIELD

The instant invention relates to an elastomeric composition that is selected from the group consisting of ethylene-propylene non-conjugated diene terpolymer ("EPDM"), isobutylene-conjugated diene copolymer ("butyl rubber"), and mixtures of the terpolymer and copolymer.

More particularly, the instant invention is directed to an elastomeric composition that may consist either of ethylene-propylene non-conjugated diene terpolymer, or of isobutylene-conjugated diene copolymer, or of mixtures of the terpolymer and copolymer and which may be applied to a roof as a roofing sheet or as a flashing member, either of which, upon exposure to ambient influences, has the ability to be crosslinked.

BACKGROUND OF THE INVENTION

Elastomeric ethylene-propylene non-conjugated diene terpolymer ("EPDM") and isobutylene-conjugated diene copolymer ("butyl rubber") compositions are well known in the art.

Moreover, the use of EPDM and butyl rubber compositions as a material of construction for roof sheeting is also well known in the art.

Such sheeting provides, in the cured or crosslinked state, an excellent material for use on a roof in those applications where planar sheet material is either desirable or otherwise acceptable for disposition on (i.e. for purposes of being applied onto) substantially flat or moderately contoured roofing structures.

However, when the crosslinked EPDM or butyl rubber sheeting of the prior art is laid out onto certain intricately contoured surfaces of a portion of roof, such as a parapet, a chimney, a ventilator section or the like, the substantially planar or generally flat crosslinked sheeting material of the prior art is often deemed not acceptable for the intended use. The reason is because the crosslinked EPDM or butyl rubber sheeting materials of the prior art lack the "formability" characteristics or physical properties needed to successfully and permanently bond to (i.e. adheringly conform with and desirably cover) the surface countours of an irregularly shaped substrate.

Roofing material that is used to follow irregular contours is known as flashing. Crosslinked EPDM or butyl rubber roof sheeting materials are not normally used as flashing because gaps are known to readily develop around roofing contours, between the sheeting section of a roof and other portions of the roof where the EPDM or butyl rubber is used as flashing.

While crosslinked EPDM and butyl rubber sheeting materials have each established an excellent reputation as an effective barrier to roof leaks for those substantially flat or moderately contoured surfaces upon which they are applied, nevertheless, such leak-protection has not been available to those portions of the roof which are characterized by their irregular shape. Thus, the excellent protection afforded by EPDM or butyl rubber compositions has not been available as flashing. This results in the general inability to protect those sections of the roof characterized by irregular shape against leakage. The utilization of EPDM or butyl rubber roof sheeting, a most effective long-term protector against water leakage, is seriously compromised by this defect in cured EPDM and butyl rubber.

As was noted above, the use of EPDM compositions as a material of construction for roof sheeting is well known in the art. Also, EPDM compositions containing accelerator-vulcanizer blends for in situ curing of roof sheeting and flashing is known—as is disclosed, e.g., in U.S. Pat. No. 4,461,875 (in the name of Crepeau).

U.S. Pat. No. 3,531,444 (in the name of Behrens) describes a vulcanizable composition that is said to include sulfur, zinc oxide, a sulfur vulcanizable hydrocarbon elastomer (such as butyl rubber), and a vulcanization accelerator composition. The vulcanization accelerator composition is said to include a combination of a bis(morpholinothiocarbonyl) sulfide of specified structure as well as either thiuramsulfide or a metal dithiocarbamate.

U.S. Pat. No. 3,644,304 (also in the name of Behrens) is directed to a vulcanizable composition that is said to include a diene modified ethylene-propylene elastomer, copper 2-mercaptobenzothiazole and either thiuram sulfide or a metal dithiocarbamate.

U.S. Pat. No. 3,897,405 (in the name of Son et al.) is directed to EPDM polymers grafted with vulcanization accelerators. This patent, more particularly, discloses the preparation of EPDM polymers having grafted thereon vulcanization accelerators and polymer blends with highly unsaturated diene rubbers that are cured using sulfur.

Another reference of interest is U.S. Pat. No. 4,012,332 (also in the name of Behrens) which discloses an accelerator composition for the vulcanization of diene elastomers, comprising a benzothiazole sulfenamide, a thiuram sulfide, and copper 2-mercaptobenzothiazole.

The lack of elasticity of uncured EPDM in addition to its favorable characteristics of excellent weatherability, low temperature flexibility, and resistance to direct sunlight lends itself for use as roof flashing.

Once the uncured EPDM roof sheeting and flashing are installed, it is desirable that the ambient cure takes place as soon as possible so as to develop desirable physical properties similar to vulcanized roof membrane.

Surprisingly, it has been found that certain dialkylthioureas, when utilized as the primary accelerator in curative tri-blends, show faster self-cure at ambient temperatures than known blends containing dipentaethylenethiuram hexasulfide ("DPTH") as the primary accelerator, as taught in the above-noted U.S. Pat. No. 4,461,875 as well as in U.S. Pat. Nos. 4,514,442 and 4,666,785 (both in the name of Crepeau).

OBJECTS AND SUMMARY OF THE INVENTION

It is therefore an object of this invention to produce an improved accelerator-vulcanizer blend which is able not only to be used in the preparation of an ethylene-propylene non-conjugated diene terpolymer (EPDM) roof sheeting material but also which also would allow the EPDM sheet material to be cured in situ during roof service.

The foregoing as well as other objects, features and advantages of the instant invention will become more readily understood to those skilled in the art upon reading the following detailed description.

In accordance with the instant invention, a composition is provided comprising (a) one hundred (100) parts-by-weight of an elastomer that is selected from the group consisting of ethylene-propylene non-conjugated diene terpolymer ("EPDM"), isobutylene-conjugated diene copolymer ("butyl rubber"), and mixtures thereof; (b) 0.1 to 3.0 parts-by-weight of a dialkylthiourea; (c) 0.4 to 5.0 parts-by-weight of sulfur or one or more sulfur donor curatives; and (d) 0.4 to 5.0 parts-by-weight of one or more accelerators selected from the group consisting of thiurams and dithiocarbamates, wherein components (b), (c) and (d) are all parts-by-weight per one hundred parts-by-weight of (a), and wherein the composition is essentially free of hexasulfide compounds having the structural formula $[(CH_2)_n NCS]_2 S_6$, wherein "n" is 4 or 5.

Also disclosed is a method of curing a thermosetting rubber composition on a roof in ambient temperature conditions as well as a method of waterproofing a roof exposed to ambient air.

DETAILED DESCRIPTION OF THE INVENTION

In one embodiment of this invention there is provided a roofing composition in which the curing composition (also of this invention) is incorporated. The roofing composition may be in the form of sheets of desired dimension, usually formed by calendering or extruding the sheet, cutting the sheet to desired size and shape. In particular, the sheets resulting from the practice of this invention advantageously may be cut for use as roof sheeting or flashing members.

When used as a roof covering, the composition of this invention may cover any roofing base material, such as wood, composition board, concrete, brick or metal. In many applications, insulating or vapor barrier layers may be first placed over the roof bottom prior to the disposition of the composition of this invention. It is emphasized, however, that such layers are not essential to the carrying out of this invention.

Accordingly, one preferred embodiment of this invention is directed to a method of protecting roofs having irregular surface contours from water leaks by disposing the composition of this invention on (i.e., applying the composition of this invention onto) such roofs.

In a related use, the composition of this invention is employed as a water liner. In such an application, sheets of the composition are preferably used as a reservoir liner, a pond liner, and the like.

As was briefly noted above, the composition of this invention comprises an elastomer selected from the group consisting of ethylene-propylene non-conjugated terpolymer ("EPDM"), isobutylene-conjugated diene copolymer ("butyl rubber"), and a mixture of EPDM and butyl rubber. These EPDM and butyl rubbers generally have iodine numbers below 100.

Optionally, a smaller proportion, generally less than 40 weight per cent, of sulfur vulcanizable natural or synthetic elastomers (such as a highly unsaturated thermosetting rubber) having iodine numbers above 100 (i.e., SBR, BR, IR, NBR, NR) are also present with a so-called "critical" compound of the thiourea class of accelerators.

The term "SBR" means styrene-butadiene rubber. The term "BR" means butadiene rubber. The term "IR" means isoprene rubber. The term "NBR" means acrylonitrile-butadiene rubber. The term "NR" means natural rubber. (Nomenclature of these polymers is taken from ASTM D1418.)

Illustrative of such "critical" compounds are the alkylthioureas and dialkylthioureas, with the following types being preferred compounds: N,N'-diethylthiourea, ethylene thiourea, dimethylethylthiourea, trimethylthiourea, and tetraalkylthiourea. Most preferred are ethylene thiourea and N,N'-diethylthiourea.

A second so-called "critical" cure compound is sulfur, preferably between 1.0 and 2.0 parts-by-weight per 100 parts-by-weight of above-noted elastomer with respect to amount and in a commercially-available elemental form such as the commonly used rhombic crystalline form called "rubber makers' sulfur" or "spider sulfur."

A third so-called "critical" cure component is a cure accelerator of one of the following classes:

1. *Thiazoles,* wherein representative cure accelerators of this type are benzothiazyl disulfide and 2-mercaptobenzothiazole; and
2. *Thiuram Monosulfides & Thiuram Disulfides*, wherein typical cure accelerators among the thiuram monosulfides and disulfides are included lower-alkyl, monocyclic, and aryl and cyclic alkylene thiuram sulfides, wherein representative materials are as follows:
   Tetramethylthiuram disulfide,
   Tetramethylthiuram monosulfide,
   Tetraethylthiuram disulfide,
   Tetrabutylthiuram monosulfide,
   Diisopropylthiuram disulfide, and
   Phenylethylthiuram disulfide.

More than one of the cure accelerators may be utilized to optimize the desired blend of cured properties, and to optimize the processing characteristics. The use of more than one cure accelerator may also be desirable to accommodate the solubility limitations of each type of accelerator, when used in EPDM or butyl rubber, for example.

Also, the tendency of certain materials to "bloom" to the surface of the rubber part can be minimized by maintaining each material at a level well below the solubility limit in the base rubber elastomer.

To that end, a preferred embodiment of the invention utilizes a fourth component, namely a dithiocarbamate-type accelerator, such as a salt of a dialkyldithiocarbamate, wherein the alkyl groups may have from 1 to 6 carbon atoms, and wherein such a salt may be formed in conjunction with bismuth, cadmium, copper, iron, lead, potassium, selenium, sodium, tellurium or zinc ions. Specific examples are:

Zinc dibutyldithiocarbamate,
Zinc pentamethylenedithiocarbamate,
Bismuth dimethyldithiocarbamate,
Nickel dibutyldithiocarbamate,
Copper dimethyldithiocarbamate,
Selenium diethyldithiocarbamate,
Lead dimethyldithiocarbamate,
Selenium dimethyldithiocarbamate,
Tellurium dimethyldithiocarbamate,
Tellurium diethyldithiocarbamate,
Cadmium diethyldithiocarbamate,
Zinc dibenzyldithiocarbamate,
Zinc dimethyldithiocarbamate, and
Zinc diethyldithiocarbamate.

In one preferred embodiment EPDM is used as the elastomer in the composition of this invention. The EPDM used is a terpolymer which includes ethylene and one or more olefin monomer(s) having the general formula $H_2C=CHR$, wherein R is an alkyl group having from 1 to 7 carbon atoms. In a particularly preferred embodiment, one such olefin monomer is propylene.

The most commonly employed non-conjugated dienes in the terpolymer of this invention are 1,4-hexadiene, dicyclopentadiene and 5-ethylidene-2-norbornene.

The EPDM also includes a non-conjugated diene which may be a $C_6$–$C_{12}$ linear or $C_9$–$C_{10}$ bridged ring hydrocarbon diene that is copolymerizable with the aforementioned monomers.

In another preferred embodiment, the elastomer of the composition of this invention is butyl rubber. If used, the butyl rubber of this invention is isobutylene-conjugated diene copolymer comprising from 0.5 to 10% by weight of conjugated diene.

Among the dienes within the contemplation of this invention are 2-methyl-1,3-butadiene; 1,3-butadiene; and 2,3-dimethylbutadiene-1,3. Of these, 2-methyl-1,3-butadiene is most preferred.

In yet another preferred embodiment, the elastomer is a mixture of EPDM and butyl rubber, wherein the EPDM and butyl rubber have the meanings given above. There is no limitation on the relative amounts of the two constituents.

The relative ratios of the (a) akylthiourea to (b) sulfur to (c) either thiazole or thiuram may vary widely. In this regard, a weight ratio range of 1.0:0.5:0.5 to 1:5:5 is desirable; a ratio range of 1:1:1 to 1:3:3 is preferred; and a ratio range of 1:1.5:1 to 1:2:2 is more preferred.

The dithiocarbamate is preferably added in amounts approximately equal to the thiazole/thiuram component. If a thiazole and a thiuram are added, the total amount can be represented in the ratios above.

It is also within the contemplation of this invention that additional ingredients may be incorporated into the composition of this invention.

Among the additives that can be present in this composition are processing oils, plasticizers, and filler and reinforcing agents.

Among the filler and reinforcing agents especially useful in the composition of this invention are carbon black, silicates, talc, clay, calcium carbonate, and the like, and mixtures thereof.

Other optional ingredients include activators (such as zinc oxide, stearic acid, zinc stearate), antidegradants, tackifiers and processing aids, all of which may all be considered as forming a part of the thermosetting roofing composition of this invention, and when if added.

In this regard, the term "curable elastomer" will always be presumed to contain a metal oxide such as zinc oxide normally in conjunction with a fatty acid such as stearic acid or, alternatively, with a metal stearate such as zinc stearate which combines the activating effects of the metal oxide and fatty acid.

The compounding of the composition of this invention may be accomplished by any suitable means including an internal mixer, a transfer mixer, an extruder or an open mill. Independent of the method of compounding the composition, the resulting composition has a cure rate which correlates with the development of cross-linking.

EXAMPLES

The following examples, intended to further illustrate the invention, are not intended to limit the scope of the invention in any manner.

Examples 1–3 and Comparative Experiment A

A master batch (1) concentrate was prepared by adding 60 parts by weight of EPDM to a type "B" laboratory Banbury [™] internal mixer set at 77 revolutions per minute. To this was added 65 parts by weight of a first type of carbon black (type N-650); 65 parts by weight of a second type of carbon black (type N-339); 65 parts by weight of an extender oil (paraffinic petroleum oil, ASTM D 2226, Type 104 B, Sunpar [™] 2280, R. E. Carroll, Inc.); 30 parts by weight of a plasticizer (polybutenes, Indopol [™] H300, Amoco Chemicals Corporation); 10 parts by weight of a processing aid (polymer of mixed olefins, Betaprene [™]H-100, Reichhold Chemicals Inc.); 5 parts by weight of zinc oxide; and 1 part by weight of stearic acid. To this was added 40 parts by weight of EPDM.

Thus, the total EPDM constituent made up 100 parts by weight of the composition.

After the remaining EPDM was added, the ram of the internal mixer was lowered. Mixing for one minute followed, at which time the mixer contents temperature reached 115° C. The ram was then raised, the ram and throat of the mixer were swept, and the ram was again lowered.

Mixing continued for an additional 90 seconds at which time the compound temperature reached 138° C. The mixer was stopped, the ram was raised, and the master batch was dropped onto a mill to cool.

Four compositions were prepared employing the above master batch (1). The EPDM uncured rubber, comprising 100 parts of the 336 parts by weight of master batch (1), included a blend of 60 parts of a terpolymer noted as "EPDM I."

EPDM 1 is a terpolymer containing 51.9% ethylene, 39.1% propylene and 9.0% 5-ethylidene-2-norbornene, all percentages being by weight. EPDM I had a Mooney viscosity (ML-1 plus 4) at 125° C. of 68.

The remaining 40 parts by weight of EPDM was a terpolymer denoted as "EPDM II." EPDM II is a terpolymer containing 71.6% ethylene, 23.9% propylene and 4.5% 5-ethylidene-2-norbornene, all such percentages being based on the total weight of the terpolymer. EPDM II had a Mooney Viscosity (ML-1 plus 4) at 125° C. of 77.

To master batch (1), on a mill, was added a constant amount of mercaptobenzothiazole ("MBT"), zinc O,O-dibutylphosphorodithioate ("ZDBP"), zinc dimethyldithiocarbamate ("ZMDC") and sulfur, the concentrations of which are summarized in Table I below.

Four examples, Sample A and Nos. 1–3, were prepared from these four compositions, whose preparation is described above. Each example, as identified above, included 336 parts by weight of master batch (1), comprising 100 parts by weight of EPDM, the exact constituency of which is recited above.

To the four examples were added 0.6 parts by weight of dipentaethylenethiuram hexasulfide ("DPTH"), tetramethylthiuram disulfide ("TMTD"), 4-morpholinyl-2-benzothioazole disulfide ("MBS") and ethylene thiourea ("ETU"), respectively.

These samples were then banded on the back roll of a 20.32 cm×40.64 cm mill at a preset temperature of 95° C. (front roll temperature) and 65° C. (back roll temperature). The nip between the rolls was next adjusted to provide a 2.03 mm sheet, while maintaining about 2 cm rolling bank of compound. After 30 seconds, air-free sheet was cut from the mill and dusted with mica for easier handling.

For testing purposes, six 7.62 cm×15.24 cm samples were cut from the dusted sheet and hung in an air-circulating oven. From both the unaged and aged samples (Standard Dumbbell, Die A) were cut according to ASTM D-412. Tensile strength at break, measured in mega Pascals, and elongation at break, measured in percent, are reported; and measurements were made using an Instron [™] tester Model LTD, and the measured results were calculated in accordance with ASTM D-412. All testing was carried out at 23° C.

In addition to strength testing, the curing characteristics of the samples were investigated using a Monsanto Rheometer [™], model MPV, at 3° arc, 15 hertz ("Hz"), square die. The curing characteristics are reported as the increase in torque, measured in centi-Newton-meters ("cN.m"), between the minimum value and the value obtained after 60 minutes at 100° C.

The results of these tests, as presented in Table I, show the cure efficiency of ethylene-thiourea as the primary accelerator.

TABLE I

| Constituents, in parts by weight Example or Comparative Experiment | A | 1 | 2 | 3 |
|---|---|---|---|---|
| Master Batch (1) | 336 | 336 | 336 | 336 |
| MBT | 0.6 | 0.6 | 0.6 | 0.6 |
| ZDBP | 1.5 | 1.5 | 1.5 | 1.5 |
| ZMDC | 0.6 | 0.6 | 0.6 | 0.6 |
| Sulfur | 1.5 | 1.5 | 1.5 | 1.5 |
| DPTH | 0.6 | — | — | — |
| TMTD | — | 0.6 | — | — |
| MBS | — | — | 0.6 | — |
| ETU | — | — | — | 0.6 |
| PHYSICAL PROPERTIES | | | | |
| Rheometer, @ 100° C. Torque (60), cN · m Unaged | 73.4 | 18.1 | 52.0 | 125.4 |
| 100% modulus, MPa | 0.7 | 0.6 | 0.6 | 0.6 |
| Tensile, MPa | 1.9 | 1.7 | 1.7 | 1.7 |
| Elongation, % | 850 | 860 | 860 | 830 |
| Aged* | | | | |
| 100% Modulus, MPa | 1.4 | 0.9 | 1.1 | 1.6 |
| Change, % | (+100) | (+50) | (+85) | (+165) |
| Tensile, MPa | 10.2 | 3.9 | 5.9 | 11.0 |
| Change, % | (+435) | (+130) | (+245) | (+545) |
| Elongation, % | 700 | 660 | 750 | 640 |
| Change, % | (−18) | (−23) | (−13) | (−23) |

*7 days at 70° C. in a circulating-air oven

Examples 4–5 and Comparative Experiment B

An additional master batch (2) concentrate was prepared in accordance with the procedure enumerated in Example 1. However, blends of different EPDM's were employed. That is, the relative weight ratios of ethylene and propylene were the same as in Example 1, but lower molecular weight polymers were used. The uncured rubber, comprising 100 parts of the 336 parts by weight of master batch (2), included a blend of 50 parts of a terpolymer noted as "EPDM III" and had a Mooney Viscosity (ML-1 plus 4) at 125° C. of 55. The remaining 50 parts by weight of EPDM denoted as "EPDM IV" had a Mooney Viscosity (ML-1 plus 4) at 125° C. of 50.

Four compositions, denoted as Sample B and Nos. 4–5, were prepared from master batch (2) in which the concentration of ZDBP, ZMDC and sulfur were maintained at a constant level of 1.5, 0.6 and 1.5 parts by weight, respectively, per 100 parts EPDM. These samples included additional accelerators within the contemplation of this invention. The concentration of these accelerators was maintained constant in all the compositions of this example.

Table II below summarizes and defines the four compositions produced. In addition, these samples were tested in accordance with the procedures set forth in Example 1.

TABLE II

| Constituents in parts by weight Example or Comparative Experiment | B | 4 | 5 |
|---|---|---|---|
| Master Batch (2) | 336 | 336 | 336 |
| MBT | 0.6 | 0.6 | — |
| ZDBP | 1.5 | 1.5 | 1.5 |
| ZMDC | 0.6 | 0.6 | 0.6 |
| Sulfur | 1.5 | 1.5 | 1.5 |
| DPTH | 0.6 | — | — |
| DETU | — | 0.6 | 0.6 |
| TeEDC | — | — | 0.6 |
| PHYSICAL PROPERTIES | | | |
| Rheometer, @ 100° C. Torque (60), cN · m Unaged | 58.8 | 106.2 | 115.3 |
| 100% modulus, MPa | 0.38 | 0.41 | — |
| Tensile, MPa | 0.41 | 0.44 | 0.41 |
| Elongation, % | 1000+ | 1000+ | 1000+ |
| Aged* | | | |
| 100 Modulus, MPa | 0.97 | 1.66 | — |
| Change, % | (+155) | (+305) | — |
| Tensile, MPa | 4.62 | 8.69 | 9.72 |
| Change, % | (+1026) | (+1875) | (+2270) |
| Elongation, % | 650 | 570 | 560 |

*7 days at 70° C. in a circulating-air oven.

Examples 6–8

Additional samples Nos. 6–8 were prepared using the same EPDM sheeting compounds as in Example 1, with the exception of the accelerators used. Along with ETU as a primary accelerator, the following secondary accelerator showed increasing cure rates in the following order: (1) ZMDC, (2) Tellurium diethyldithiocarbamate (TeEDC), and (3) TMTD. ZMDC, TeEDC and TMTD, all in blends with ETU, exhibit cure rates useful for ambient curing EPDM compounds.

A summary of the constituents of these compositions, Nos. 6–8 and the results of physical testing, as described in Example 1, employing these three samples, are tabulated in Table III.

TABLE III

| Example | 6 | 7 | 8 |
|---|---|---|---|
| Master Batch (1) | 336 | 336 | 336 |
| Sulfur | 1.5 | 1.5 | 1.5 |
| ETU | 1.0 | 1.0 | 1.0 |
| ZMDC | 1.0 | — | — |
| TMTD | — | 1.0 | — |
| TeEDC | — | — | 1.0 |
| PHYSICAL PROPERTIES | | | |
| Rheometer, @ 100° C. Torque (60), cN · m Unaged | 37.3 | 68.3 | 44.1 |
| 100% modulus, MPa$^{(A)}$ | 0.6 | 0.6 | 0.6 |
| Tensile, MPa | 1.2 | 1.2 | 1.2 |
| Elongation, % | 850 | 850 | 850 |
| Aged* | | | |
| 100 Modulus, MPa | 1.0 | 1.7 | 1.3 |
| Change, % | +67 | +183 | +117 |
| Tensile, MPa | 3.2 | 9.3 | 6.8 |

TABLE III-continued

| Example | 6 | 7 | 8 |
|---|---|---|---|
| Change, % | +167 | +675 | +467 |
| Elongation, % | 480 | 650 | 670 |

(A) Masterbatch, not including sulfur or accelerator
*7 days at 70° C. in a circulating-air oven.

Examples 9–20 and Comparative Experiments C–J

Roof sheeting samples were prepared using the same EPDM Master Batch as in Example 1 to further evaluate thioureas versus DPTH in low temperature flashing cure systems. Table IV summarizes the composition of the roof sheeting samples of these examples, as well as the percent improvement in cure rate of the thioureas versus that of DPTH as measured by the increase in torque using a Monsanto Rheometer [™] as described in Example 1.

From the results of these tests it can be seen that even under mild aging conditions, e.g. 70° C., that a composition within the contemplation of this invention surprisingly develops a state of cure that is superior to compositions having DPTH as the primary accelerator.

All comparative examples (C–J) are the prior art compounds which are disclosed in related U.S. Pat. Nos. 4,461,875; 4,514,442 and 4,666,785 and which are based on DPTH as a necessary so-called "critical" component of an ambient cure roofing composition.

TABLE IV

| Example or Comparative Experiment | C | 9 | D | 10 | E | 11 | 12 | 13 |
|---|---|---|---|---|---|---|---|---|
| Master Batch (1) | 336 | 336 | 336 | 336 | 336 | 336 | 336 | 336 |
| DPTH | 1 | — | 1 | — | 1 | — | — | — |
| ETU | — | 1 | — | 1 | — | 1 | — | — |
| DETU(A) | — | — | — | — | — | — | 1 | — |
| DBTU(B) | — | — | — | — | — | — | — | 1 |
| MBT | 1 | 1 | 1 | 1 | — | — | — | — |
| ZMDC | 1 | 1 | — | — | 1 | 1 | 1 | 1 |
| TMTD | — | — | 1 | 1 | 1 | 1 | 1 | 1 |
| ZDBP | — | — | — | — | — | — | — | — |
| TeEDC | — | — | — | — | — | — | — | — |
| Sulfur | 1.50 | 1.50 | 1.50 | 1.50 | 1.50 | 1.50 | 1.50 | 1.50 |
| PHYSICAL PROPERTIES | | | | | | | | |
| Torque (60), cN · m | 85.9 | 90.4 | 83.6 | 91.5 | 56.5 | 63.3 | 63.3 | 56.5 |
| Improvement, % | — | 5.2 | — | 9.4 | — | 12.0 | 12.0 | 0 |

| Example or Comparative Experiment | F | 14 | 15 | 16 | G | 17 |
|---|---|---|---|---|---|---|
| Master Batch (1) | 336 | 336 | 336 | 336 | 336 | 336 |
| DTPH | 1 | — | — | — | 1 | — |
| ETU | — | 1 | — | — | — | 1 |
| DETU | — | — | 1 | — | — | — |
| DBTU | — | — | — | 1 | — | — |
| MBT | — | — | — | — | — | — |
| ZMDC | — | — | — | — | — | — |
| TMTD | 1 | 1 | 1 | 1 | 1 | 1 |
| ZDBP | 1 | 1 | 1 | 1 | — | — |
| TeEDC | — | — | — | — | 1 | 1 |
| Sulfur | 1.50 | 1.50 | 1.50 | 1.50 | 1.50 | 1.50 |
| PHYSICAL PROPERTIES | | | | | | |
| Torque (60), cN · m | 55.4 | 89.3 | 78.0 | 72.3 | 64.4 | 140.1 |
| Improvement, % | — | 61.2 | 40.8 | 30.5 | — | 117.5 |

| Example or Comparative Experiment | H | 18 | I | 19 | J | 20 |
|---|---|---|---|---|---|---|
| Master Batch (1) | 336 | 336 | 336 | 336 | 336 | 336 |
| DPTH | 1 | — | 1 | — | 0.6 | — |
| ETU | — | 1 | — | 1 | — | 0.6 |
| DETU | — | — | — | — | — | — |
| DBTU | — | — | — | — | — | — |
| MBT | — | — | — | — | 0.6 | 0.6 |
| ZMDC | — | — | — | — | 0.6 | 0.6 |
| TMTD | — | — | 1 | 1 | — | — |
| ZDBP | 1 | — | — | — | 1.5 | 1.5 |
| TeEDC | 1 | 1 | — | — | — | — |
| Sulfur | 1.50 | 1.50 | 1.50 | 1.50 | 1.50 | 1.50 |
| PHYSICAL PROPERTIES | | | | | | |
| Torque (60), cN · m | 59.9 | 87.0 | 45.2 | 71.2 | 73.5 | 117.5 |
| Improvement, % | — | 45.2 | — | 57.5 | — | 59.9 |

(A) The term "DETU" means N,N'-diethylthiourea.
(B) The term "DBTU" means N,N'-dibutylthiourea.

Examples 21–23 and Comparative Experiment K

Additional roof sheeting samples were prepared using the same EPDM Master Batch (1) as in Example 1 to show that even at the lower 0.5 part sulfur level, ETU still shows up better than the DPTH. Higher sulfur levels (1.0 and 1.5) further increase the torque change at low temperatures, as expected. These results appear below in Table V.

TABLE V

| Example or Comparative Experiment | K | 21 | 22 | 23 |
|---|---|---|---|---|
| Master Batch (1) | 336 | 336 | 336 | 336 |
| DPTH | 1.0 | — | — | — |
| ETU(A) | — | 1.0 | 1.0 | 1.0 |
| TMTD | 1.0 | 1.0 | 1.0 | 1.0 |
| Sulfur | 0.5 | 0.5 | 1.0 | 1.5 |
| PHYSICAL PROPERTIES | | | | |
| Rheometer, @ 100° C. Torque (60),(B) cN · m | 19.2 | 23.7 | 54.2 | 67.8 |

Footnotes:
(A) 1.33 parts of END-75 (75% ETU/25% EPR).
(B) Increase in torque between minimum and 60 minute values.

What has been described in this specification is an elastomeric composition which can be used either in a roof sheeting application or in a roof flashing application. In that regard, while the invention has been described with reference to preferred embodiments or examples, it is to be understood that the invention is not to be limited to such. In particular, various additional features of the present invention, including functional compositional alternatives as well as other functional equivalents, will become apparent to those skilled in the art upon reading the foregoing specification. It is to be understood, therefore, that all such functional equivalents are to be considered as forming a part of this invention insofar as they fall within the spirit and scope of the following claims.

We claim:

1. A roofing composition comprising:
   (a) 100 parts of an elastomer selected from the group consisting of ethylenepropylene non-conjugated diene terpolymer, butyl rubber, and mixtures thereof;
   (b) 0.1 to 3.0 parts of a dialkylthiourea selected from the group consisting of N,N'-diethyl-thiourea, ethylene thiourea, dimethylethylthiourea, trimethylthiourea, and tetraalkylthiourea;
   (c) 0.4 to 5.0 parts of sulfur;
   (d) 0.4 to 5.0 parts of one or more accelerators selected from the group consisting of thiazoles thiurams and dithiocarbamates,
   wherein components (b), (c) and (d) are all parts by weight per one hundred parts by weight of (a),
   said composition being free of hexasulfide compounds having the structural formula $[(CH_2)_n NCS]_2 S_6$, wherein "n" is 4 or 5; and
   (e) a cure activating amount of an activator of a metal oxide, fatty acid or metal stearate of a type useful in rubber curing.

2. A roofing composition in accordance with claim 1 wherein said component (d) comprises a first accelerator selected from the thiurams and a second accelerator selected from the dialkyldithiocarbamates.

3. A roofing composition in accordance with claim 2 wherein said first accelerator is tetramethylthiuram disulfide.

4. A roofing composition in accordance with claim 2 wherein said second accelerator is a zinc salt of dimethyldithiocarbamate.

5. A roofing composition in accordance with claim 2 wherein said second accelerator is tellurium diethyldithiocarbamate.

6. A roofing composition in accordance with claim 1 wherein said sulfur is between 1.0 and 2.0 parts.

7. A roofing composition in accordance with claim 1 wherein said dialkylthiourea is N,N'-diethylthiourea.

8. A roofing composition in accordance with claim 1 further comprising less than 40 parts of a highly unsaturated thermosetting rubber having an iodine number above 100.

9. A roofing composition in accordance with claim 1 wherein said elastomer is ethylene-propylene non-conjugated diene terpolymer.

10. A roofing composition in accordance with claim 1 further comprising at least one processing oil.

11. A roofing composition in accordance with claim 1, further comprising at least one plasticizer.

12. A roofing composition in accordance with claim 1, further comprising at least one filler and reinforcing agent.

13. A roofing composition in accordance with claim 12 wherein said filler and reinforcing agent is selected from the group consisting of carbon black, silicates, talc, clay, calcium carbonate, and mixtures thereof.

* * * * *